United States Patent Office 3,053,780
Patented Sept. 11, 1962

3,053,780
VINYL CHLORIDE POLYMERS PLASTICIZED
WITH FUMARATE ADDUCTS
Joachim Dazzi, Basel, Switzerland, assignor to Monsanto
 Chemical Company, St. Louis, Mo., a corporation of
 Delaware
No Drawing. Original application Nov. 20, 1953, Ser.
 No. 393,490, now Patent No. 2,909,536, dated Oct. 20,
 1959. Divided and this application May 4, 1959, Ser.
 No. 810,537
4 Claims. (Cl. 260—23)

This invention relates to derivatives of sperm oil and more particularly provides adducts of sperm oil and esters of fumaric acid, a method of preparing said adducts, and vinyl chloride polymers plasticized by said adducts.

According to the invention there are prepared adducts in which from one to 4 moles of a fumarate are attached to an intermediate carbon atom of the hydrocarbon chains of the acidic and/or alcoholic portions of unsaturated sperm oil esters. The present adducts thus have the formula

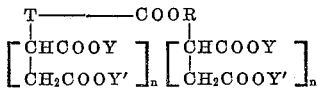

in which T is an alkenyl residue corresponding to the hydrocarbon chain of the acidic portion of an unsaturated sperm oil ester, R is an alkenyl residue corresponding to the hydrocarbon chain of the alcohol portion of an unsaturated sperm oil ester, Y and Y' are alkyl radicals of from 1 to 6 carbon atoms and $n$ is an integer of from 0 to 2 and in which one $n$ must be at least 1.

As is known in the art, sperm oil is a whale oil which differs from the majority of naturally occurring oils in that the alcohol portions of some of the esters present therein are derived from long-chain monohydric alcohols such as oleyl alcohol rather than from glycerine.

Fumarates with which sperm oil is condensed to yield the present adducts are simple or mixed alkyl fumarates having from 1 to 6 carbon atoms, e.g., methyl, ethyl, isopropyl, n-propyl, n-butyl, tert-butyl, n-amyl, isoamyl or n-hexyl fumarate or the mixed esters such as ethyl methyl, tert-amyl propyl or n-butyl hexyl fumarate. A mixture of two or more fumarates may be used.

Reaction of sperm oil with the fumarate to form adducts takes place readily by heating the oil with the ester in the presence or absence of an inert diluent at ordinary or super-atmospheric pressures. When operating at atmospheric pressure, temperatures of from say, 150° C. to 300° C. and preferably of from 180° C. to 250° C. are used. When working with readily polymerizable fumarates an inhibitor of polymerization may be incorporated into the reaction mixture. The number of carboalkoxy groups introduced into the sperm oil molecule depends upon the nature of the individual ester used, and upon the reaction conditions employed. Generally, operation within the higher temperature ranges, i.e., at temperatures of above, say, 180° C. and below the decomposition point of any of the reactants leads to introduction of more carboalkoxy groups than does operation at the lower temperatures. Usually the lower alkyl fumarates are more reactive than the higher alkyl fumarates. In view of the effect of the reaction conditions and nature of the fumarates upon the extent of carboalkoxylation, it is recommended that for each initial run there be experimentally determined the operating conditions which should be observed for obtaining the desired dgree of carboalkoxylation.

The quantity of fumarate present in the adduct will also depend upon its availability in the reaction mixture. For the formation of adducts in which at least one mole of the fumarate or the like has added with the sperm oil, the calculated amount of fumarate should be present in the reaction mixture.

Since the alkyl fumarates are misible with sperm oil, no extraneous solvent or diluent need be employed. For successful reaction, the diluent may or may not be present. In order to avoid local overheating, the heating and distilling operations are conducted on the oil-bath.

The present adducts are stable, high-boiling poly carboxylates which range from clear, viscous liquids to waxy solids. They are advantageously used for a variety of industrial purposes, and they are characterized by conferring improved plasticity to synthetic resins and plastics when incorporated therein. They impart increased flexibility to vinyl chloride polymers, which flexibility is retained at even low temperatures. At high temperatures, the present adducts are not readily volatilized from the plasticized composition, even when present in concentrations of up to 50% by weight.

The present adducts are valuable plasticizers for polyvinyl chloride and copolymers of at least 70 percent by weight of vinyl chloride and up to 30 percent by weight of an unsaturated monomer copolymerized therewith, for example, vinyl acetate, vinylidene chloride, etc. Adducts of acyclic olefinic acids and fatty oils have been hitherto generally suggested for use as softening agents. I have now found, however, that the sperm oil-alkyl fumarate adducts are of outstanding value as plasticizers, these adducts serving not only to soften vinyl chloride polymers, but also to impart simultaneously low temperature flexibility, extremely good temperature stability and great mechanical strength to these polymers. While many of the esters described in the prior art are incompatible with polymers and copolymers of vinyl chloride, and do not give continuous, homogeneous compositions, the present adducts are compatible with vinyl chloride polymers and show no exudation of plasticizers even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i.e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. The value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is a modified carbon absorption test procedure of the Society of Plastics Industry.

*Water resistance.*—The amount of water absorption and the amount of leaching that takes place when the plasticized composition is immersed in distilled water for 24 hours is determined.

The invention is further illustrated, but not limited, by the following examples:

*Example 1*

A mixture consisting of 140 g. of sperm oil and 400 g. of n-butyl fumarate was heated at a temperature of from 260° C.–270° C. for 6 hours and 20 minutes. During this period the refractive index of the reaction mixture had increased from 1.4499 to 1.4632. Distillation of the heated mixture to remove material boiling below 244° C./2 mm. gave as residue 376 g. of the viscous adduct, $n_D^{25}$ 1.4683 having a saponification number of 172.55 and analyzing 68.82% carbon and 9.84% hydrogen. From these constants as well as from the fact that 140 g. of unreacted material was recovered in the distillation, the viscous residue is an adduct in which an average of 1.685 moles of the n-butyl fumarate has added to one mole of the sperm oil.

*Example 2*

A mixture consisting of 140 g. of sperm oil and 280 g. of n-butyl fumarate was heated at a temperature of from 260–270° C. for 3.5 hours. Distillation of the resulting reaction mixture gave 112.0 g. of material boiling below 230° C./1.5 mm., probably unreacted fumarate and polymer. The distillation residue (303.1 g.) was an adduct in which an average of 1.16 moles of fumarate had combined with one mole of the sperm oil calculated as oleyl oleate. The present adduct was not so viscous as the adduct of Example 1.

*Example 3*

Sixty parts of polyvinyl chloride and 40 parts by weight of the sperm oil-butyl fumarate adduct of Example 1 were mixed together on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 21.2° C. which value denotes good low temperature properties. Tests on the volatility characteristics of the plasticized composition gave a value of 0.57 percent which showed extremely good retention of plasticizer and indicated good temperature characteristics of the composition. The plasticized material had a hardness of 87 before the volatility test and a hardness of 88 after the volatility test. When subjected to heat at a temperature of 325° F. for a period of 30 minutes, the clarity and color of the molded sheet were substantially unchanged. The water resistance test showed a solids loss value of 0.16 percent and a water absorption of 0.43 percent.

Similar evaluation of the sperm oil-butyl fumarate adduct of Example 1 wherein the adduct was employed in a concentration of 30 parts by weight per 70 parts of polyvinyl chloride gave a low temperature flexibility value of minus 15° C., a volatility value of 0.6%, a hardness of 100 before the volatility test and 101 after the volatility test, a solids-loss value of 0.02% and water-absorption of 0.44%. In attempts to employ sperm oil itself as a polyvinyl chloride plasticizer, the oil was found to be very incompatible with the polymer.

Instead of the ester employed in the examples above, adducts of other alkyl fumarates and sperm oil, e.g., the adduct of diethyl fumarate or of di-n-hexyl fumarate and sperm oil may be employed to yield similarly valuable plasticized products.

While the above examples show only compositions in which the ratio of plasticizer to polymer content is 40:60, the content of adduct to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of adduct based on the total weight of the plasticized composition yielding desirable products.

Although the invention has been described particularly with reference to the use of the sperm oil-fumarate adducts as plasticizers for polyvinyl chloride, these esters are advantageously employed also as plasticizers for copolymers of vinyl chloride, for example, the copolymers of vinyl chloride with vinyl acetate or vinylidene chloride, etc. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The sperm oil-fumarate adducts are of general utility in softening vinyl chloride polymers. They may be used as the only plasticizing component in a compounded vinyl chloride polymer or they may be used in conjunction with other plasticizers.

This application is a division of my copending application, Serial No. 393,490, filed November 20, 1953, now Patent No. 2,909,536, issued October 20, 1959.

What I claim is:

1. A resinous composition comprising a vinyl chloride polymer plasticized with an adduct having the formula

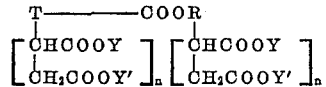

in which T is an alkenyl residue corresponding to the hydrocarbon chain of the acidic portion of an unsaturated sperm oil ester, R is an alkenyl residue corresponding to the hydrocarbon chain of the alcohol portion of an unsaturated sperm oil ester, Y and Y' are alkyl radicals of from 1 to 6 carbons atoms and $n$ is an integer of from 0 to 2 and in which one $n$ must be at least 1, said adduct being from 10% to 50% by weight of the composition.

2. A resinous composition comprising polyvinyl chloride plasticized with an adduct having the formula

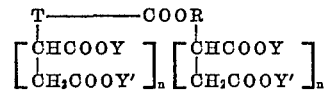

in which T is an alkenyl residue corresponding to the hydrocarbon chain of the acidic portion of an unsaturated sperm oil ester, R is an alkenyl residue corresponding to the hydrocarbon chain of the alcohol portion of an unsaturated sperm oil ester, Y and Y' are alkyl radicals of from 1 to 6 carbon atoms and $n$ is an integer of from 0 to 2 and in which one $n$ must be at least 1, said adduct being from 10% to 50% by weight of the composition.

3. A resinous composition comprising a copolymer of at least 70% by weight of vinyl chloride and up to 30% by weight of an unsaturated monomer copolymerizable therewith, said copolymer being plasticized with an adduct having the formula

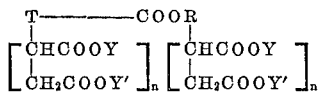

in which T is an alkenyl residue corresponding to the hydrocarbon chain of the acidic portion of an unsaturated sperm oil ester, R is an alkenyl residue corresponding to the hydrocarbon chain of the alcohol portion of an unsaturated sperm oil ester, Y and Y' are alkyl radicals of from 1 to 6 carbon atoms and $n$ is an integer of from 0 to 2 and in which one $n$ must be at least 1, said adduct being from 10% to 50% by weight of the composition.

4. A resinous composition comprising polyvinyl chloride plasticized with an adduct having the formula

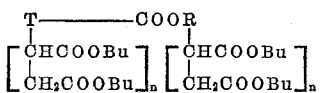

in which T is an alkenyl residue corresponding to the hydrocarbon chain of the acidic portion of an unsaturated sperm oil ester, R is an alkenyl residue corresponding to the hydrocarbon chain of the alcohol portion of an unsaturated sperm oil ester, Bu is the butyl radical and $n$ is an integer of from 0 to 2 and in which one $n$ must be as least 1, said adduct being from 10% to 50% by weight of the composition.

References Cited in the file of this patent
UNITED STATES PATENTS

| | | |
|---|---|---|
| 2,423,364 | Blair et al. | July 1, 1947 |
| 2,598,636 | Dazzi | May 27, 1952 |
| 2,687,421 | Butler | Aug. 24, 1954 |